US012580265B2

(12) United States Patent
Hamelin et al.

(10) Patent No.: US 12,580,265 B2
(45) Date of Patent: Mar. 17, 2026

(54) MOUNTING APERTURE SEALS FOR A VEHICLE BATTERY PACK

(71) Applicant: GM Global Technology Operations LLC, Detroit, MI (US)

(72) Inventors: Phillip Daniel Hamelin, Clarkston, MI (US); Alexander M. Bilinski, Avoca, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 281 days.

(21) Appl. No.: 18/449,901

(22) Filed: Aug. 15, 2023

(65) Prior Publication Data

US 2025/0062472 A1     Feb. 20, 2025

(51) Int. Cl.
| | |
|---|---|
| *B60K 1/04* | (2019.01) |
| *B60L 50/64* | (2019.01) |
| *H01M 50/244* | (2021.01) |
| *H01M 50/249* | (2021.01) |
| *H01M 50/264* | (2021.01) |

(52) U.S. Cl.
CPC ............. *H01M 50/249* (2021.01); *B60K 1/04* (2013.01); *B60L 50/64* (2019.02); *H01M 50/244* (2021.01); *H01M 50/264* (2021.01); *H01M 2220/20* (2013.01)

(58) Field of Classification Search
CPC .... B60K 1/04; H01M 50/262; H01M 50/249; B60L 50/64; B60L 50/66
See application file for complete search history.

(56) References Cited

U.S. PATENT DOCUMENTS

| | | | | |
|---|---|---|---|---|
| 11,038,236 B2 * | 6/2021 | Montgomery | ...... | H01M 50/244 |
| 2012/0107650 A1 | 5/2012 | Kritzer et al. | | |
| 2024/0391308 A1 * | 11/2024 | Hilmann | ................. | B60K 1/04 |

FOREIGN PATENT DOCUMENTS

DE     102015204841 A1     9/2016

* cited by examiner

*Primary Examiner* — Jason D Shanske
*Assistant Examiner* — James J Triggs
(74) *Attorney, Agent, or Firm* — CANTOR COLBURN LLP

(57) ABSTRACT

A battery pack for a vehicle, in accordance with a non-limiting example, includes a housing including a base, a plurality of side walls and a cover extending across the plurality of side walls. The cover includes an outer surface portion and an inner surface portion, and an aperture extending through the outer surface portion and the inner surface portion. A grommet having a central opening is arranged in the aperture. The grommet includes a first portion engaging the outer surface portion, a second portion engaging the inner surface portion, and a connecting portion joining the first portion and the second portion. A compression limiter having a passage is mounted in the central opening of the grommet. The compression limiter includes a flange surrounded by the first portion of the grommet and a support portion extending through the connecting portion to the second portion of the grommet.

20 Claims, 4 Drawing Sheets

MOUNTING APERTURE SEALS FOR A VEHICLE BATTERY PACK

INTRODUCTION

The subject disclosure relates to the art of vehicle battery packs and, more particularly, to a mounting aperture seal for a vehicle battery pack.

Vehicle battery packs include a housing that surrounds multiple battery modules that enclose battery cells. The housing includes a cover that is sealed. The battery pack is mounted in the vehicle through the cover. In general, the battery pack is positioned below the vehicle and against a lower surface. Fasteners are passed through a floor of the vehicle from within interior vehicle spaces, passed through the cover, and engaged with the battery pack. When tightened, the battery pack is secured to the vehicle.

After manufacture, and prior to transport to an assembly facility, a vacuum is created in the housing. The vacuum is part of an end-of-line vacuum test of the housing and ensures that the battery pack is properly sealed for shipping. Apertures in the cover that receive the fasteners create obstacles to forming the vacuum for shipping. Accordingly, it is desirable to provide a seal that will close the apertures to allow a vacuum to be pulled in the housing and yet still provide a passage for mechanical fasteners for mounting the battery pack to the vehicle.

SUMMARY

A battery pack for a vehicle, in accordance with a non-limiting example, includes a housing including a base, a plurality of side walls and a cover extending across the plurality of side walls. The cover includes an outer surface portion and an inner surface portion, and an aperture extending through the outer surface portion and the inner surface portion. A grommet having a central opening is arranged in the aperture. The grommet includes a first portion engaging the outer surface portion, a second portion engaging the inner surface portion, and a connecting portion joining the first portion and the second portion. A compression limiter having a passage is mounted in the central opening of the grommet. The compression limiter includes a flange surrounded by the first portion of the grommet and a support portion extending through the connecting portion to the second portion of the grommet. A plug is arranged in the passage.

In addition to one or more of the features described herein a connecting member is arranged between the housing and the cover, the connecting member including a threaded passage that aligns with the aperture in the cover.

In addition to one or more of the features described herein the support portion of the compression member abuts the connecting member.

In addition to one or more of the features described herein the first portion of the grommet includes a first thickness and the flange includes a second thickness that is distinct from the first thickness.

In addition to one or more of the features described herein the first thickness is greater than the second thickness.

In addition to one or more of the features described herein the flange of the compression limiter includes an annular recess, the first portion of the grommet overlapping the annular recess.

In addition to one or more of the features described herein the grommet is formed from an elastic material.

In addition to one or more of the features described herein the compression limiter is formed from an inelastic material.

In addition to one or more of the features described herein the inelastic material includes one of a metal and a metal alloy.

In addition to one or more of the features described herein the plug is formed from a self-healing pierceable elastic material.

A vehicle, in accordance with a non-limiting example, includes a body defining a passenger compartment having a floor including an inner surface and an outer surface. A battery pack is mounted to the outer surface of the floor. The battery pack includes a housing including a base, a plurality of side walls and a cover extending across the plurality of side walls. The cover includes an outer surface portion and an inner surface portion, and an aperture extending through the outer surface portion and the inner surface portion. A grommet having a central opening is arranged in the aperture. The grommet includes a first portion engaging the outer surface portion, a second portion engaging the inner surface portion, and a connecting portion joining the first portion and the second portion. A compression limiter having a passage is mounted in the central opening of the grommet. The compression limiter includes a flange surrounded by the first portion of the grommet and a support portion extending through the connecting portion to the second portion of the grommet. A plug arranged in the passage. A fastener extends through the floor into the plug. The fastener securing the battery pack to the outer surface of the floor.

In addition to one or more of the features described herein a connecting member is arranged between the housing and the cover. The connecting member includes a threaded passage that aligns with the aperture in the cover. The fastener extends through the plug into engagement with the threaded passage.

In addition to one or more of the features described herein the support portion of the compression member abuts the connecting member.

In addition to one or more of the features described herein the first portion of the grommet includes a first thickness and the flange includes a second thickness that is distinct from the first thickness.

In addition to one or more of the features described herein the first thickness is greater than the second thickness.

In addition to one or more of the features described herein the flange of the compression limiter includes an annular recess, the first portion of the grommet overlapping the annular recess.

In addition to one or more of the features described herein the grommet is formed from an elastic material.

In addition to one or more of the features described herein the compression limiter is formed from an inelastic material.

In addition to one or more of the features described herein the inelastic material includes one of a metal and a metal alloy.

In addition to one or more of the features described herein the plug is formed from a self-healing pierceable elastic material.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
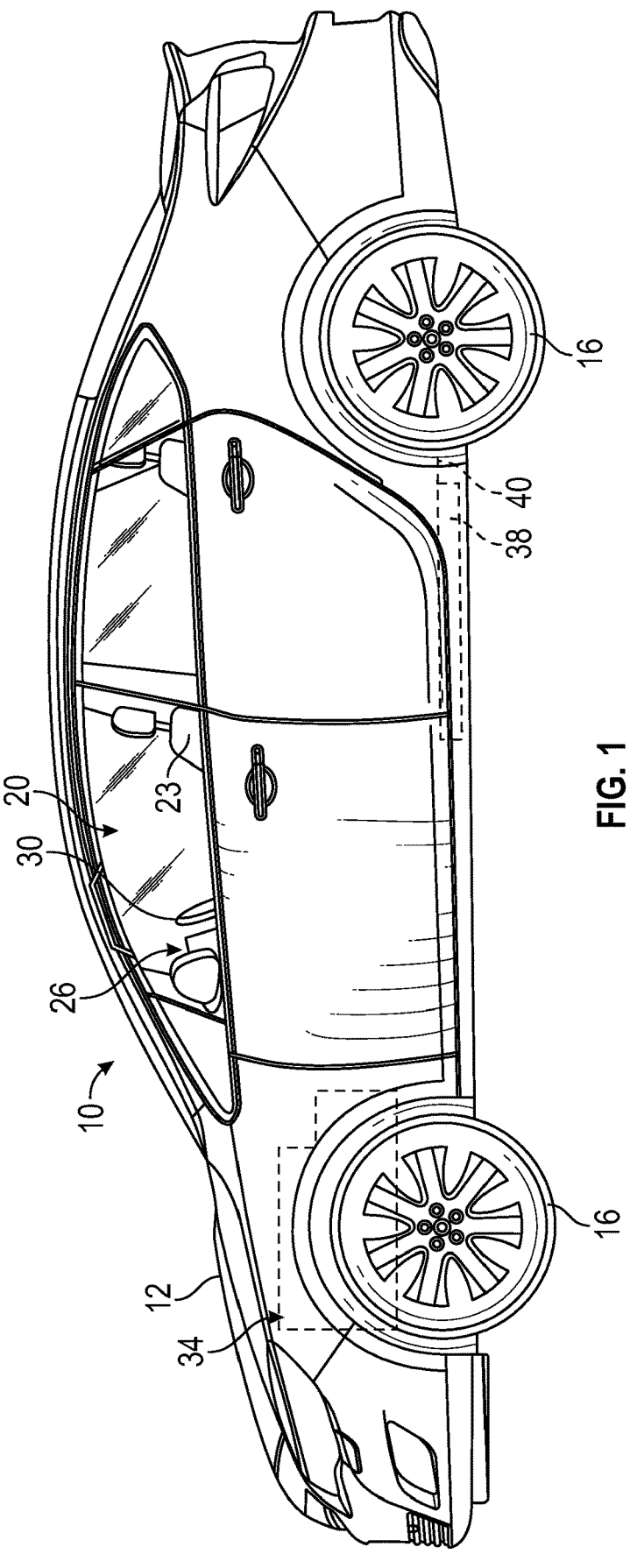
FIG. 1 is a left side view of a vehicle including a battery pack having mounting aperture seals, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s). Vehicle 10 includes an electric drive motor 34 that provides power to one or more of the plurality of wheels 16.

A rechargeable energy storage system (RESS) or battery pack 38 is mounted to body 12. Battery pack 38 provides power to electric drive motor 34. At this point, it should be understood that the location of electric drive motor 34 and battery pack 38 in vehicle 10 may vary. In a non-limiting example, passenger compartment 20 includes a floor 40 having an inner surface 42 and an outer surface 44 (FIG. 3). As will be detailed herein, battery pack 38 is mounted to outer surface 44 of floor 40 below vehicle 10. In a non-limiting example, a support member 48, FIG. 2, may provide additional support and protection for battery pack 38.

Figure 2:
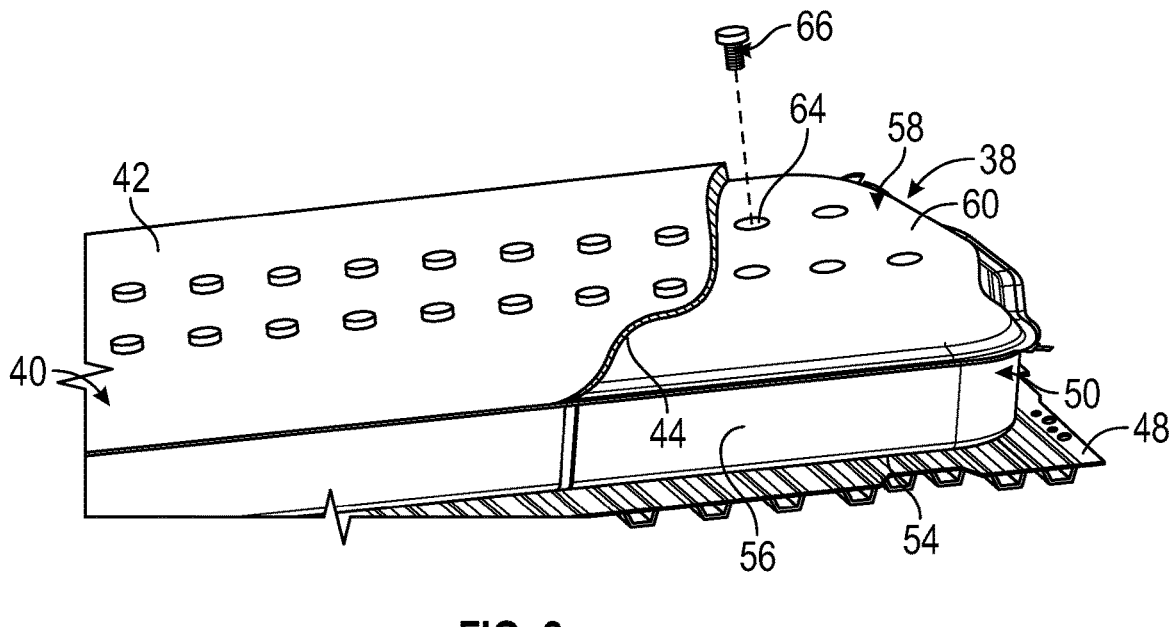
FIG. 2 is a partial perspective view of the battery pack of FIG. 1 including a plurality of mounting aperture seals, in accordance with a non-limiting example.
Figure 3:
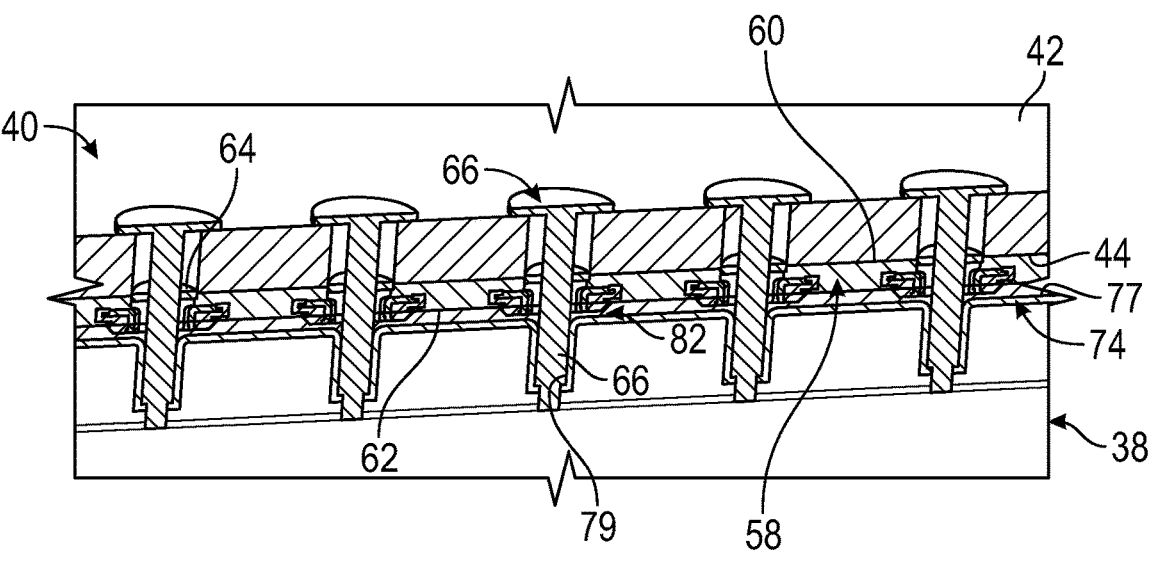
FIG. 3 is a cross-sectional side view of a portion of the battery pack connected to the vehicle, in accordance with a non-limiting example.

In a non-limiting example illustrated in FIG. 2, battery pack 38 includes a housing 50 having a base 54 and a plurality of side walls 56 that connect with and extend from base 54. A cover 58 is positioned across the plurality of side walls 56. Housing 50 contains a number of battery cells (not shown) that may receive, store, and release electrical energy. Cover 58 includes an outer surface portion 60 and an inner surface portion 62, FIG. 5. A plurality of apertures 64 extend through cover 58. Apertures 64 provide passage for mechanical fasteners 66 to pass through cover 58 and into battery pack 38.

As shown in FIG. 3, a plurality of mechanical fasteners 66 pass through floor 40 in passenger compartment 20 and connect with battery pack 38 as will be detailed herein. Each of the plurality of mechanical fasteners 66 passes through floor 40 into a corresponding one of the plurality of apertures 64 in cover 58 of battery pack 38. In a non-limiting example, battery pack 38 includes a connecting member 74 arranged below cover 58. Connecting member 74 includes a surface 77 including a plurality of threaded passages 79. Each of the plurality of mechanical fasteners 66 connects with a corresponding one of the threaded passages 79 to secure battery pack 38 to body 12.

Figure 4:
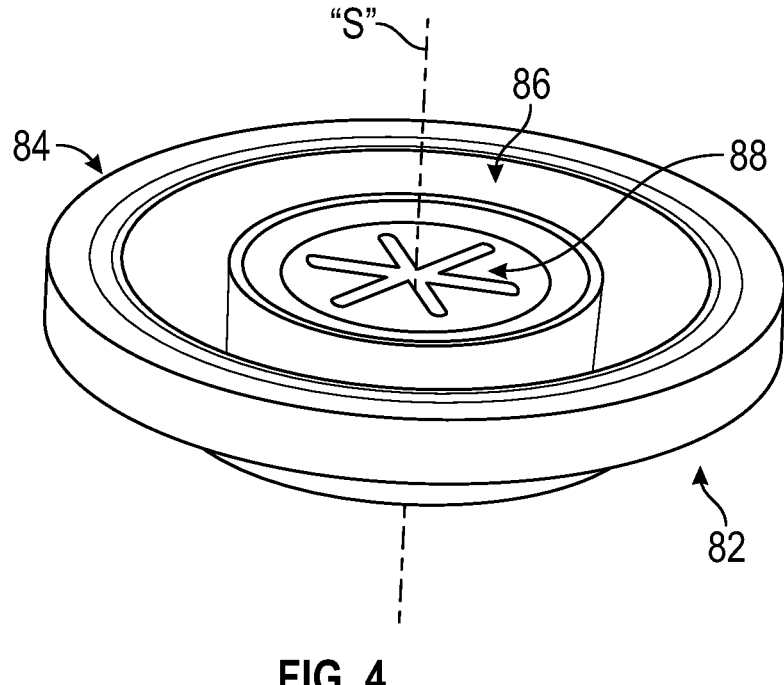
FIG. 4 is a perspective view of a mounting aperture seal, in accordance with a non-limiting example.
Figure 5:
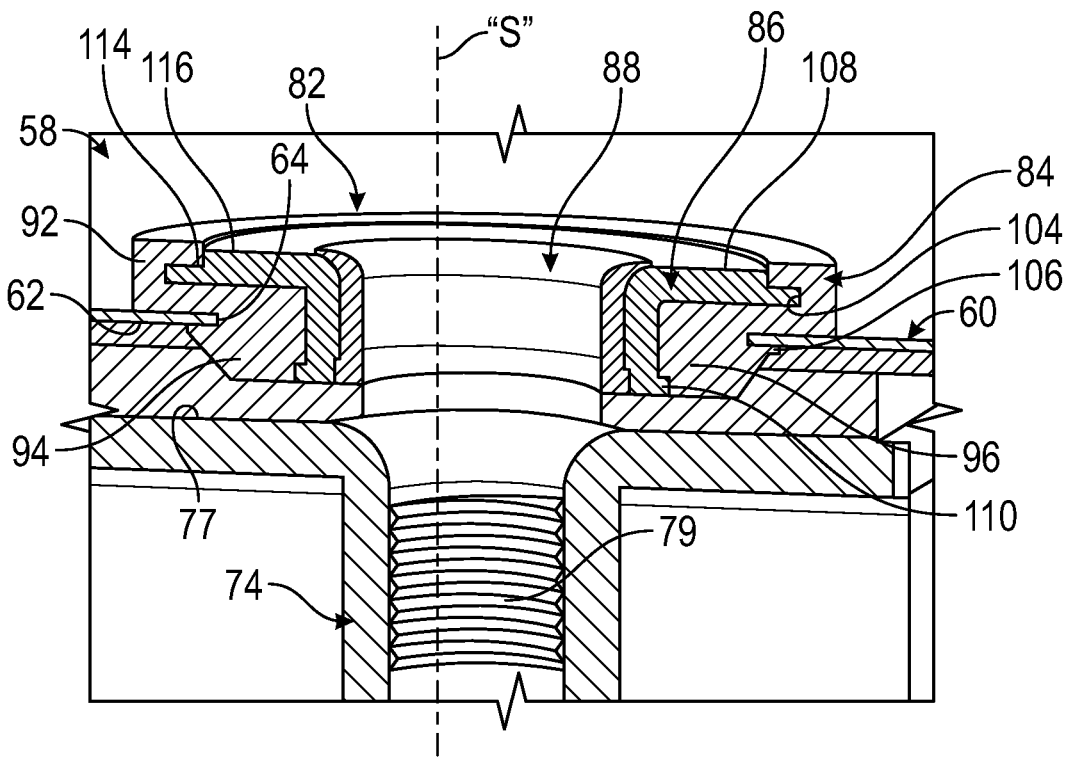
FIG. 5 is a cross-sectional view of a mounting aperture seal mounted in a cover of the battery pack of FIG. 2.

In a non-limiting example shown in FIGS. 3 and 5, a seal assembly 82 is secured in each of the plurality of apertures 64 in cover 58. Seal assembly 82 serves a number of functions. First, seal assembly 82 closes apertures 64 so that battery pack 38 may undergo a post fabrication vacuum check to ensure housing 50 is properly sealed. Seal assembly 82 also closes off apertures 64 to prevent contamination during transport from a fabrication facility to an installation facility. Seal assembly 82 further provides a sealed passage for mechanical fasteners 66. As shown in FIG. 4, seal assembly 82 includes a grommet 84, a compression limiter 86, and a plug 88. Grommet 84 may be formed from a number of materials including elastic materials, inelastic material, a metal material, and materials formed from various mixtures or alloys including metal alloys.

Figure 6:
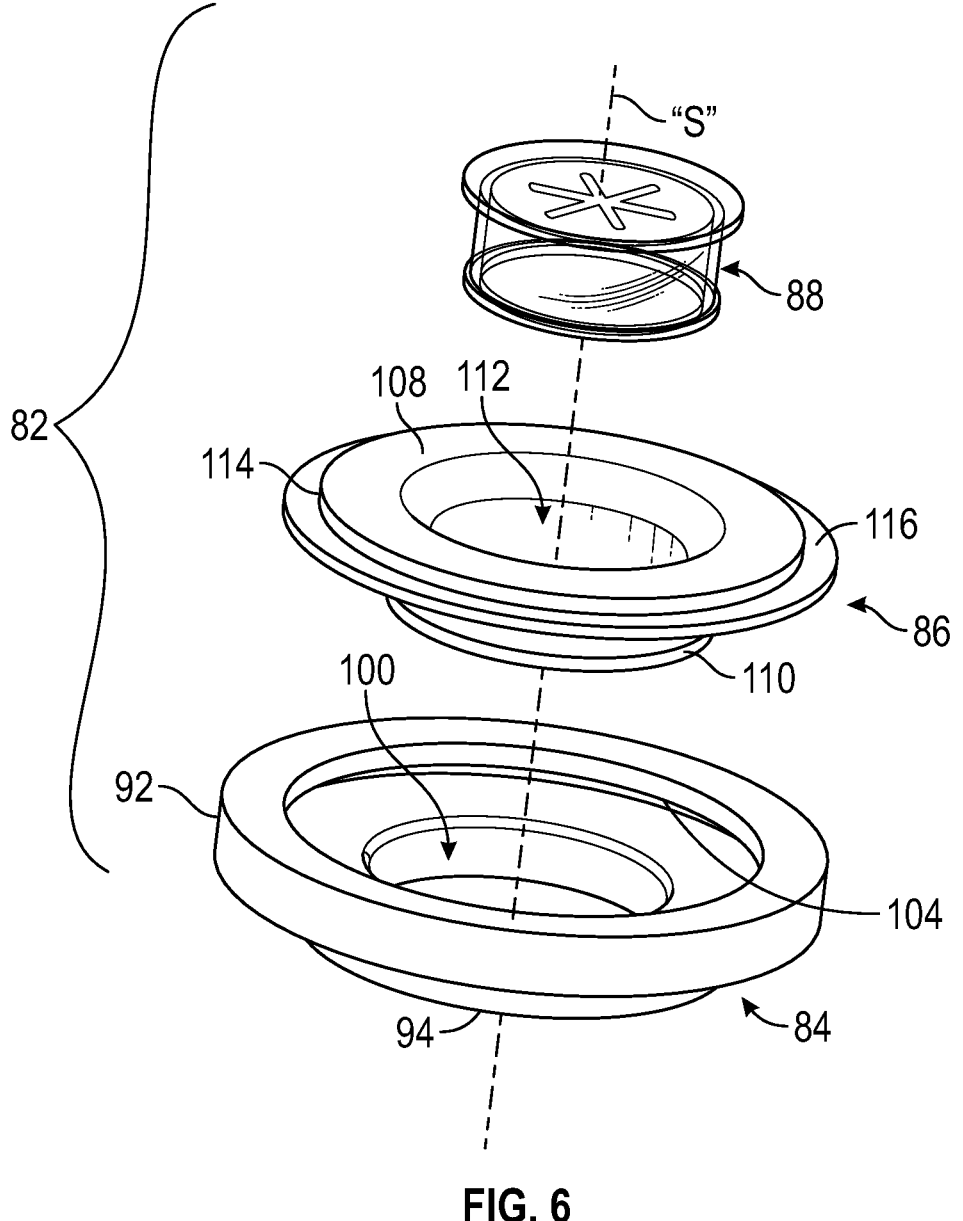
FIG. 6 is a disassembled view of the mounting aperture seal of FIG. 4, in accordance with a non-limiting example.

Reference will follow to FIGS. 5 and 6, with continued reference to FIG. 4 in describing seal assembly 82. In a non-limiting example, grommet 84 includes a first portion 92, a second portion 94, and a connecting portion 96 that extends along a seal axis "S" between first portion 92 and second portion 94. Grommet 84 includes a central opening 100 that passes through first portion 92, second portion 94, and connecting portion 96. Grommet 84 is passed into aperture 64. First portion 92 rests on outer surface portion 60 of cover 58 and includes an annular recess 104. Second portion 94 includes a barb portion 106 that engages inner surface portion 62 of cover 58. First portion 92 includes a first thickness along the seal axis "S".

In a non-limiting example, compression limiter 86 is designed to support compression loads that may form when mounting battery pack 38 to body 12 without inhibiting seal efficacy. Compression limiter 86 includes a flange 108 having a second thickness along seal axis "S" that is less than the first thickness. As will be detailed herein, flange 108 nests within first portion 92 of grommet 84. Compression limiter 86 also includes a support portion 110 having a passage 112. Support portion 110 extends from flange 108 through connecting portion 96 of grommet 84 and, when installed in aperture 64, abuts surface 77 of connecting member 74.

In a non-limiting example, flange 108 includes an annular recess portion 114 that forms an annular step 116. Annular step 116 is received by annular recess 104 in first portion 92 of grommet 84. First portion 92 of grommet 84 overlaps onto annular step 116. Plug 88 is installed into passage 112 of compression limiter 86. Plug 88 includes a substantially cylindrical cross-section and is formed from a self-healing material. That is, when pierced, plug 88 envelops and seals against mechanical fastener 66.

In operation seal assembly 82 may seal apertures 64 and hold vacuum in housing 50. Seal assembly 82 may also prevent dirt, water, and other debris from entering housing 50 during transport. When installed, mechanical fastener 66 passes through floor 40, through plug 88 and engages connecting member 74 through threaded passages 79. As each mechanical fastener 66 is tightened, inner surface section 72 of washer 68 presses on compression limiter 86. Support portion 110 of compression limiter 86 engages connecting member 74 limiting compression force being applied to grommet 84. In this manner, grommet 84 continues to seal aperture 64 after battery pack 38 is mounted to body 12.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery pack for a vehicle comprising:
a housing including a base, a plurality of side walls and a cover extending across the plurality of side walls, the cover including an outer surface portion and an inner surface portion opposite the outer surface portion and an aperture extending through the outer surface portion and the inner surface portion;
a grommet having a central opening arranged in the aperture, the grommet including a first portion engaging the outer surface portion, a second portion extending through the aperture and including a barb portion that engages the inner surface portion, and a connecting portion joining the first portion and the second portion;
a compression limiter having a passage mounted in the central opening of the grommet, the compression limiter including a flange surrounded by the first portion of the grommet and a support portion extending through the connecting portion to the second portion of the grommet; and
a plug arranged in the passage.

2. The battery pack according to claim 1, further comprising a connecting member arranged between the housing and the cover, the connecting member including a threaded passage that aligns with the aperture in the cover.

3. The battery pack according to claim 2, wherein the support portion of the compression limiter abuts the connecting member.

4. The battery pack according to claim 1, wherein the first portion of the grommet includes a first thickness and the flange includes a second thickness that is distinct from the first thickness.

5. The battery pack according to claim 4, wherein the first thickness is greater than the second thickness.

6. The battery pack according to claim 1, wherein the flange of the compression limiter includes an annular recess, the first portion of the grommet overlapping the annular recess.

7. The battery pack according to claim 1, wherein the grommet is formed from an elastic material.

8. The battery pack according to claim 7, wherein the compression limiter is formed from an inelastic material.

9. The battery pack according to claim 8, wherein the inelastic material includes one of a metal and a metal alloy.

10. The battery pack according to claim 1, wherein the plug is formed from a self-healing pierceable elastic material.

11. A vehicle comprising:
a body defining a passenger compartment having a floor including an inner surface and an outer surface; and
a battery pack mounted to the outer surface of the floor, the battery pack including:
a housing including a base, a plurality of side walls and a cover extending across the plurality of side walls, the cover including an outer surface portion and an inner surface portion opposite the outer surface portion and an aperture extending through the outer surface portion and the inner surface portion;
a grommet having a central opening arranged in the aperture, the grommet including a first portion engaging the outer surface portion, a second portion extending through the aperture and including a barb portion that engages the inner surface portion, and a connecting portion joining the first portion and the second portion;
a compression limiter having a passage mounted in the central opening of the grommet, the compression limiter including a flange surrounded by the first portion of the grommet and a support portion extending through the connecting portion to the second portion of the grommet;
a plug arranged in the passage; and
a fastener extending through the floor into the plug, the fastener securing the battery pack to the outer surface of the floor.

12. The vehicle according to claim 11, further comprising a connecting member arranged between the housing and the cover, the connecting member including a threaded passage that aligns with the aperture in the cover, the fastener extending through the plug into engagement with the threaded passage.

13. The vehicle according to claim 12, wherein the support portion of the compression limiter abuts the connecting member.

14. The vehicle according to claim 11, wherein the first portion of the grommet includes a first thickness and the flange includes a second thickness that is distinct from the first thickness.

15. The vehicle according to claim 14, wherein the first thickness is greater than the second thickness.

16. The vehicle according to claim 11, wherein the flange of the compression limiter includes an annular recess, the first portion of the grommet overlapping the annular recess.

17. The vehicle according to claim 11, wherein the grommet is formed from an elastic material.

18. The vehicle according to claim 17, wherein the compression limiter is formed from an inelastic material.

19. The vehicle according to claim 18, wherein the inelastic material includes one of a metal and a metal alloy.

20. The vehicle according to claim 11, wherein the plug is formed from a self-healing pierceable elastic material.

* * * * *